United States Patent [19]

Ruckstuhl

[11] 4,203,755
[45] May 20, 1980

[54] METHOD OF AND APPARATUS FOR TREATING WASTE MATERIALS

[76] Inventor: Konrad Ruckstuhl, 1019 E. Easter Way, Littleton, Colo. 80122

[21] Appl. No.: 867,698

[22] Filed: Jan. 9, 1978

[51] Int. Cl.² ................... C05F 11/08; C05F 9/00
[52] U.S. Cl. ................................ 71/9; 71/14;
  71/64 JC; 422/164; 422/184; 422/234
[58] Field of Search ............... 422/164, 184, 187, 204,
  422/198, 210, 232, 234; 214/D38, 70, 17 A, 17
  DA; 209/3, 38, 39, 41, 34, 35; 98/56; 34/232;
  71/9, 14, 64 JC

[56] References Cited

U.S. PATENT DOCUMENTS

| 577,769 | 2/1897 | Manuell et al. | 422/232 |
| 2,878,112 | 3/1959 | Morrison | 71/9 |
| 2,903,955 | 9/1959 | Werner | 98/56 |
| 3,092,467 | 6/1963 | Tempe | 71/64 JC |
| 3,236,604 | 2/1966 | Pierson | 422/187 |
| 3,579,320 | 5/1971 | Pesses | 71/14 |
| 3,653,871 | 4/1972 | Tempe | 71/14 |
| 3,736,111 | 5/1973 | Gardner et al. | 71/9 |

FOREIGN PATENT DOCUMENTS

| 2323565 | 12/1973 | Fed. Rep. of Germany | 71/9 |
| 565719 | 8/1975 | Fed. Rep. of Germany | 71/9 |

*Primary Examiner*—R. E. Serwin
*Assistant Examiner*—Chris Konkol
*Attorney, Agent, or Firm*—Horace B. Van Valkenburgh; Frank C. Lowe

[57] ABSTRACT

Disclosed is a method of treating waste material wherein after comminution, the relatively hard material such as glass, brick, and ceramic in finely divided condition together with finely divided soft material is separated and removed to a recirculating composter.

Disclosed is a composter having a plurality of upright perforated pipes for discharge of the gaseous products of decomposition.

13 Claims, 13 Drawing Figures

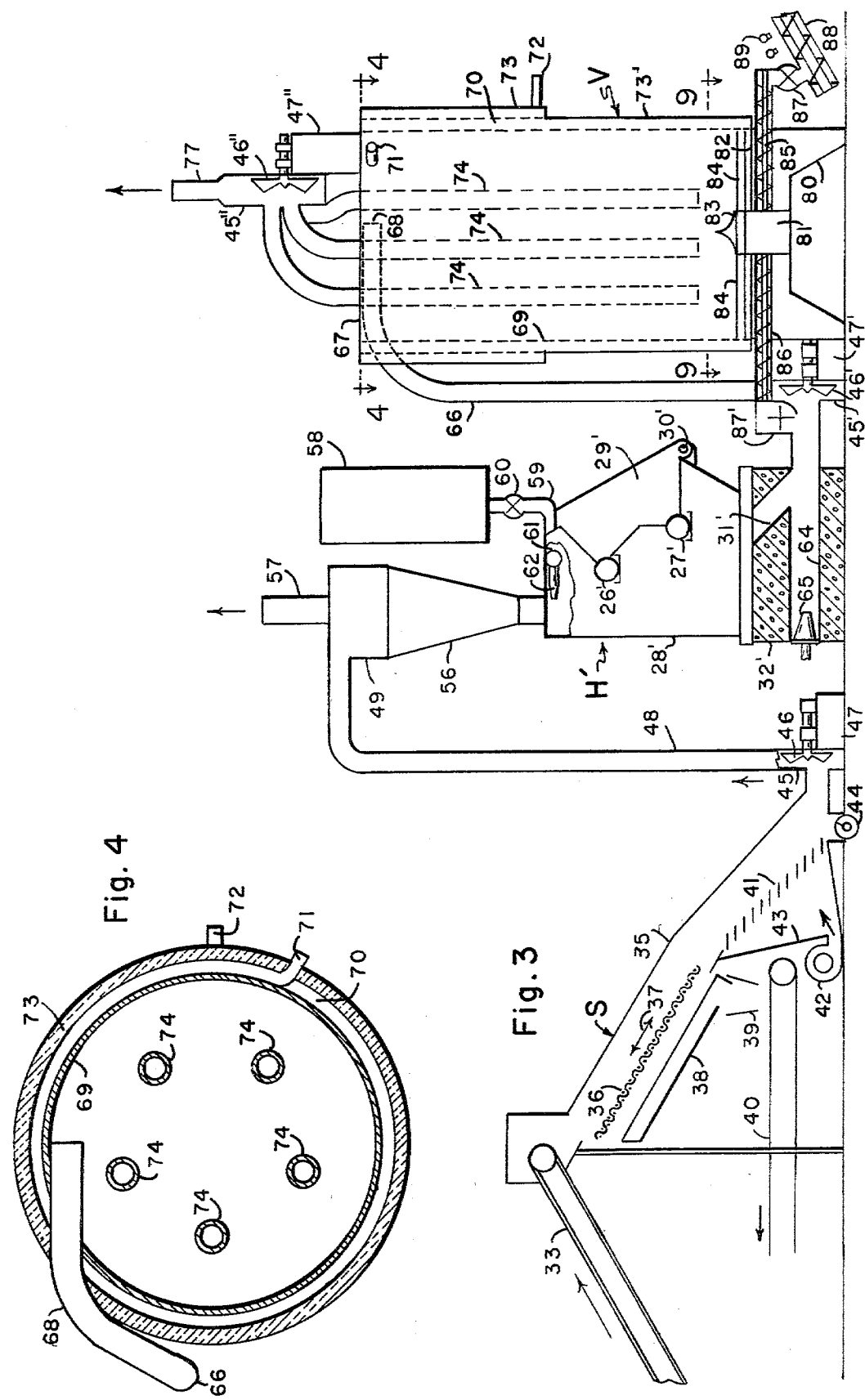

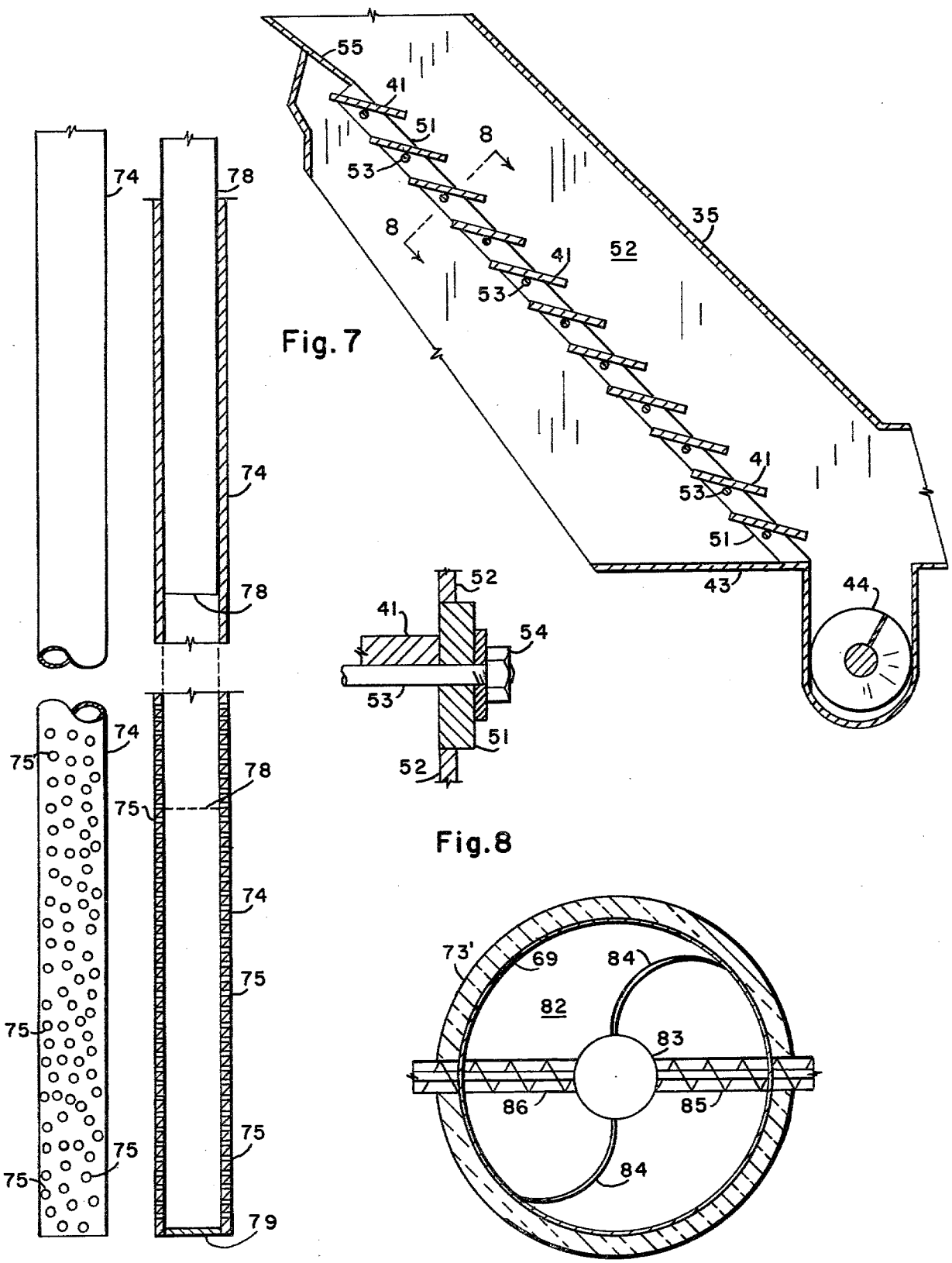

METHOD OF AND APPARATUS FOR TREATING WASTE MATERIALS

This invention relates to the treatment of waste material or refuse, and more particularly to a method of and apparatus for treating waste material or refuse, such as that obtained through collection of waste material from urban or non-urban areas.

Waste material normally includes numerous components, such as cellulose material, including paper, cardboard and the like, plastic material, rubber material, leather, ferrous material, non-ferrous material, particularly aluminum, food residue, including wet food waste, dirt, manure and the like, relatively hard materials, including glass, brick, ceramic and the like, and lawn material, such as leaves, grass, roots and the like. The relative amount of the various materials may vary from day to day, but more frequently from season to season, as well as from area to area. Waste material collected in older urban areas normally includes a higher proportion of waste food products, while that from newer urban areas includes a higher proportion of paper products. Also, waste material in non-urban areas or suburban areas, particularly at certain times of the year, may include a greater proportion of lawn material.

One of the difficulties encountered with prior methods and equipment for processing waste material has been the inability to accommodate variations in components, as well as variations in the condition of the components, i.e. a lack of adjustability to meet specific conditions. Another deficiency has been an inability to grind or comminute wet paper, for instance. Thus, a high proportion of the waste material has been relegated to use as land fill, without any production of useful or saleable products. Prior installations have also been plagued with maintenance problems, particularly in the shredder or comminution equipment, such as hammermills, in which the hammers are often required to be rewelded after 16 hours of operation, in order to remain effective, thereby requiring the installation of approximately 50% greater shredder capacity.

Among the objects of the present invention are to provide a novel method and apparatus for treating waste material by which useful products are produced from essentially all of the components of the waste material; to provide such a method and apparatus which can accommodate variations in waste composition and variations in conditions, such as moisture content; to provide such apparatus which will minimize maintenance problems; to provide such a method and apparatus which can be operated effectively when receiving varying amounts, at different times, of waste material and which may receive waste material of different compositions at various times; and to provide such a method and apparatus which will be effective and efficient in operation.

SUMMARY OF THE INVENTION

The process of this invention, for treating waste material which may include magnetic and non-magnetic material, as well as cellulosic fiber materials, relatively hard materials, such as glass, ceramic, brick, stone and the like, and relatively soft but relatively heavy materials, includig food and lawn waste material, includes the steps of separating removable magnetic material present, comminuting or shredding the remaining material, including impacting the hard material, to produce sufficiently small sizes for separation, separating by screening a finely divided fraction of material, including relatively hard material and soft but relatively heavy material, and separating cellulosic fiber material or flakes by air separation, thereby leaving a middle fraction, which may include comminuted plastic, rubber and non-ferrous metal, including aluminum. The removable magnetic material, i.e. ferrous material, initially separated is recovered in a conventional manner, while the middle fraction is also treated for recovery in a conventional manner.

Additional steps may include further comminuting the cellulosic fiber material while mixing therewith a fire retardant material, then heating and drying the comminuted cellulosic fiber material or flakes, mixed with the fire retardant material, to produce insulating material. The fire retardant material, preferably an aqueous solution of magnesium chloride and sodium carbonate, can be sprayed onto the cellulosic material being comminuted, since a novel type of hammermill is utilized for both the comminuting or shredding step specified above and the further comminuting step, since this hammermill is capable of shredding cellulosic material, such as paper or cardboard, while wet. The comminuted cellulosic material is preheated and transferred to the top of a treatment space within a vessel, the upper end of which is heated to a higher temperature, as by coils carrying a heat transfer liquid. A portion of the material at the bottom of the vessel may be recirculated with the feed, while a portion of both disinfected and dried insulating material may be discharged from the bottom of the vessel. The heated air, circulated with the cellulosic flakes to the top of the treatment vessel, moves downwardly within the flakes for removal at lower positions, along with steam and other gaseous products of drying which are withdrawn from the interior of the treatment space, as by a series of pipes extending downwardly therewithin and provided with apertures for inflow and passage through the pipes to a suction fan above the vessel. The vessel enclosing the treatment space and the various apparatus elements pertaining thereto also comprise a novel apparatus of this invention. In the event that heating does not accomplish complete sterilization, a liquid disinfectant essentially non-toxic to humans, such as propionic acid, may be sprayed onto the completed insulation, or the latter may be passed into suitably confined areas for treatment with a gaseous disinfectant, such as sulfur dioxide or chlorine.

This invention further includes transferring the fine fraction, such as finely divided glass, ceramic, brick, stone and the like, along with finely divided food waste and plant waste, to a compost digester, into the top of which the fine fraction may be fed by a bucket conveyor. Sewage sludge or manure may also be added to the fine fraction for delivery into the top of the digester, in which bacterial action takes place. No external heat may be necessary, since the heat evolved through the bacterial action may be sufficient. A portion of the already treated compost, such as 5% of the incoming feed, is removed from the bottom of the digester and added to the incoming feed, in order to enhance initial bacterial action, while completed compost may also be discharged from the bottom of the digester. In addition, gaseous products evolving through digestion, principally methane gas, are removed through a series of pipes having holes therein, for passage of the gas into each of the pipes, thence to a suction fan at the top of the digester for delivery to a point of use. Methane gas from the compost digester may be burned to produce hot gases for preheating the cellulose flakes supplied to the drying and disinfecting vessel and/or to heat the heat transfer liquid for heating the upper portion of the treatment vessel itself. The compost digester and appertinent parts are also novel apparatus of this invention.

THE DRAWINGS

Additional novel features and details of this invention will become apparent from the description which follows, taken in conjunction with the accompanying drawings, in which:

FIG. 3 is a diagrammatic side elevation of a separating section, a fiber refining section and a disinfection and drying section, including another novel hammermill and particularly a disinfecting and drying vessel for forming insulation from treated paper.

FIG. 4 is a cross section, on an enlarged scale, taken along line 4—4 of FIG. 3.

FIG. 7 is a vertical section corresponding to a portion of FIG. 3, on an enlarged scale and showing particularly an adjustable shutter device useful in air separation.

FIG. 8 is an oblique, fragmentary section, on a further enlarged scale and taken along line 8—8 of FIG. 7.

FIG. 9 is a diagrammatic cross section taken along line 9—9 of FIG. 3, near the bottom of the disinfection and drying vessel.

FIG. 10 is a condensed side elevation, on an enlarged scale, showing one of the gas removal pipes of the disinfection and drying vessel of FIG. 3.

FIG. 11 is a condensed side elevation, partly in section, showing an alternative construction of the gas removal pipe of FIG. 10.

DESCRIPTION OF THE PREFERRED EMBODIMENT

Figure 1:
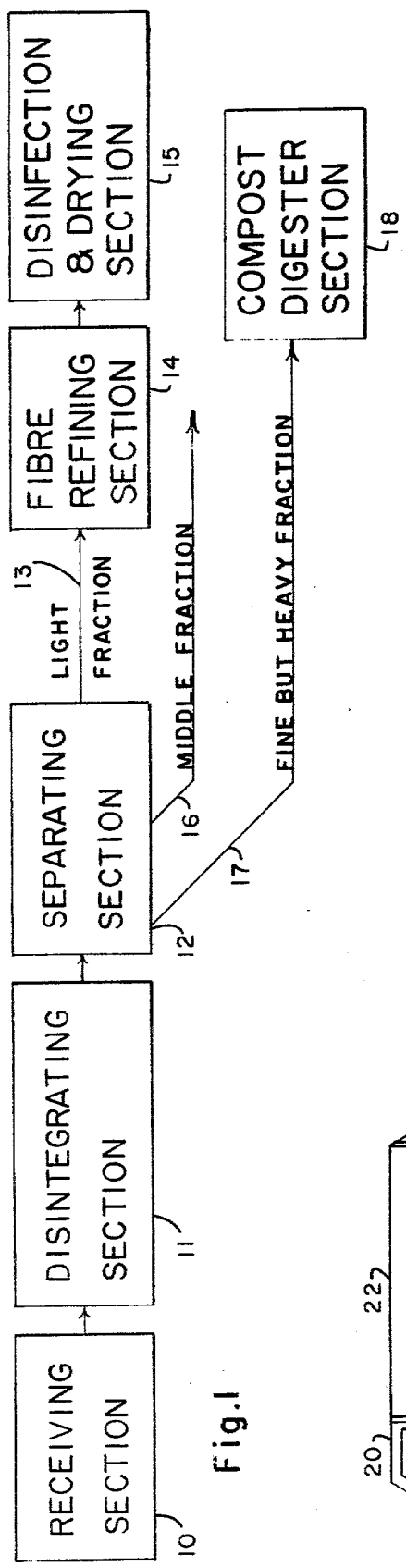
FIG. 1 is a block diagram of the process of this invention.
Figure 2:
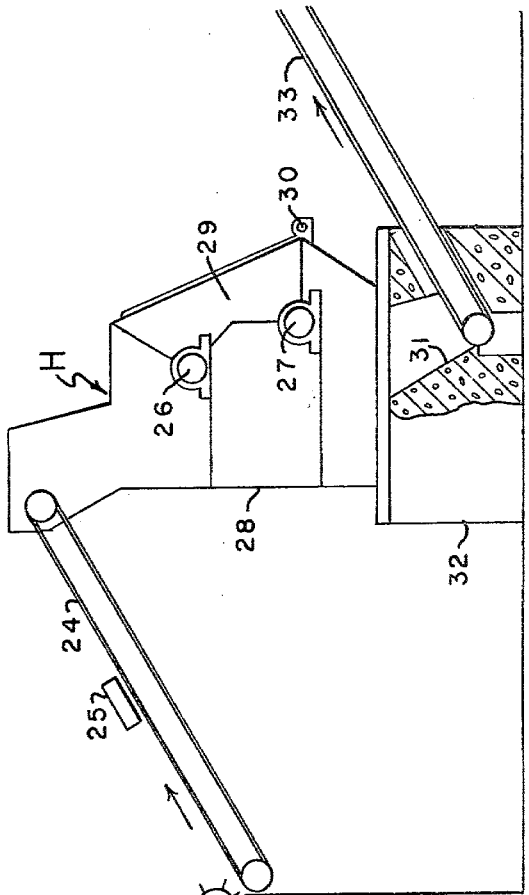
FIG. 2 is a diagrammatic side elevation of a receiving section and a disintegrating section, the latter including a novel hammermill, as referred to above and whose foundation is partially in section.

In FIG. 1, the general components of apparatus adapted to carry out the method of this invention are indicated as including a receiving section 10 and a disintegrating section 11, shown in greater detail in FIG. 2, followed by a separating section 12 in which is separated a light fraction, indicated by arrow 13, which is transferred to a fiber refining section 14 and a disinfecting and drying section 15, shown in greater detail in FIG. 3. From the separating section, a middle fraction, indicated by the arrow 16, is conveyed to a conventional apparatus (not shown) for conventional treatment, while a fine and relatively heavy fraction, indicated by arrow 17, is conveyed to a compost digester section 18, shown in greater detail in FIG. 5. For one large city, out of 1000 tons of refuse processed, approximately 300 tons of compost composed principally of the fine but heavy fraction 17 may be produced, approximately 100 tons of ferrous metal may be separated in the receiving section 10, and approximately 500 tons of paper and cardboard, represented by the light fraction 13, but consisting of approximately 90% of the total volume, may be treated. Of the remaining 100 tons, represented by the middle fraction 16, about 10% to 20% may be aluminum, with the remainder rubber, plastic and the like.

In the receiving section, as in FIG. 2, a truck 20 or other transportation device for waste material is shown as having been driven onto an elevated ramp 21, so that when the body 22 of the truck is tipped upwardly, the contents will be discharged rearwardly onto a horizontal conveyor 23 from which the material is fed onto an upwardly inclined belt conveyor 24. One or more electromagnets 25 are positioned above conveyor 24 to remove ferrous or magnetic products, which can be treated in a conventional manner. The remaining waste material is discharged into the upper end of a disintegrator, such as comprising a hammermill H having a pair of rotor shafts 26 and 27, each mounted in a horizontal position parallel to each other but both vertically and horizontally offset, as along a line at 60° to the horizontal, to provide upper and lower rotors. The hammermill is preferably constructed in the manner disclosed in my copending application Ser. No. 854,245, filed Nov. 23, 1977, and entitled "Hammermill", to which reference is made for additional details of construction. In general, each of the offset rotors includes a series of hammers, pivoted on horizontal shafts carried by discs attached to the respective shaft 26 and 27 with the circle of rotation of the outer ends of the hammers closely approaching each other, and interception means which prevents objects or pieces greater than a certain size to tend to remain on the interception means and thereby receive more forceful impacts from the hammers of the lower rotor, as well as being impacted by the hammers of the upper rotor, thereby acting as an anvil. Such interception means may comprise a series of heavy parallel bars, extending between the sets of rotating hammers of the lower rotor and disposed perpendicular to a line between the centers of the shafts 26 and 27, with the outer edges of the lower rotor hammers extending slightly through the bars at a point of closest approach to the upper rotor hammers. Thus, the extension of the lower rotor hammers enables them to nibble away, as it were, on objects intercepted by the bars. The upper rotor may be rotated at a lower speed than the lower rotor, and may have thicker and also fewer hammers. The hammermill also includes an upright housing 28 and an oblique panel 29 which is hydraulically pivotal about a shaft 30, in order to move away at the parting line shown, which intercepts both shafts, to pivot forwardly and downwardly and permit inspection of the rotors, particularly the hammers, as well as an arcuate screen located on the underside of the lower rotor, above an outlet 31. Pivoted inspection doors may also be provided at the rear of housing 28, while outlet 31 may be formed in a foundation 32 on which the housing 28 of the hammermill rests. Thus, material comminuted or ground in the hammermill and discharged through the outlet 31 falls onto an upwardly inclined conveyor 33, which may extend into the foundation 32 through a passage provided for that purpose, as shown.

As in FIG. 3, the conveyor 33 moves the material upwardly to the upper end of a separator S having a housing 35. From the top of the conveyor, the material falls onto a downwardly inclined, vibrating screen 36 which is not only moved longitudinally in alternating directions, as indicated by the double headed arrow 37, but also transversely in an upward and downward direction, with the upward and downward movements being interposed between the longitudinal movements, to produce a movement of each point on the screen generally in a rectangle. However, the upward movements in a longitudinal direction are made at a faster rate than the downward movements in a longitudinal direction, so that the inertia of the particles on the screen will cause the screen to move from under them on the upward longitudinal movement. As a result, the particles are bounced and tumbled as they move down the screen, so that those particles which are fine enough to pass through the screen will all eventually be presented to the screen surface. The screen 36 may be downwardly inclined, at an angle of 20° to 30° to the horizontal and may have apertures on the order of 3 to 6 mm., e.g. ⅛ to ¼ in., smaller than the apertures for screens used in producing waste material for land fills. The screen is preferably an Amann screen, manufactured in Switzerland, having cross wires in tension and having not only an adjustable stroke but also adjustable in speed. Such a screen will tend to produce a carpet or layer of material moving down it which will tend to become uniform in depth as it reaches the lower end of the screen, thus equalizing variations is feed rate to a marked extent. A screen length on the order of 6 meters and a width on the order of 1.8 meters for a capacity on the order of 1 cubic meter per minute may be utilized. Those particles which fall through the screen, comprising the fine but heavier fraction indicated by arrow 17 of FIG. 1, will fall into a box 38 which is reciprocated longitudinally with the screen, to insure that the fine material will not accumulate in the box and will move downwardly to an outlet at the lower end of the box, as shown. From there, the fines will move downwardly through an outlet 39 onto a conveyor 40. Of the usual waste material, the fine fraction passing through the screen 36 will normally include organic waste, including food and lawn waste material, as well as relatively hard material, such as glass, ceramic, brick, stone and the like, which has been shattered into tiny particles. The material which does not fall through the screen 36 is discharged from the end of the screen to fall downwardly over a series of downwardly inclined and vertically spaced but overlapping plates 41 which are pivotally mounted, so as to be adjustable to different angular positions. A blower 42 is adapted to deliver air into an angular housing 43 below the plates 41, so that lighter particles or flakes, particularly cellulosic material, such as newspaper waste, will be blown forwardly by the air delivered between the plates 41 toward the lower front wall of housing 35 and past a screw conveyor 44, through which the middle fraction is removed. This middle fraction, which falls off the lowest inclined plate 41 onto the conveyor 44, includes comminuted plastic, rubber, leather and non-ferrous metal, including aluminum, and may amount to approximately 10% by weight of the original material. This fraction is conveyed to a point for suitable treatment, in a conventional manner, to recover these materials. The light fraction blown forwardly from the plates 41 by the air from blower 42 moves into the inlet of a blower housing 45 containing an impeller 46, mounted on a shaft, in turn mounted on a support 47, as shown, and driven by a conventional motor and belt (not shown). The lighter fraction is blown upwardly by impeller 46 through a pipe 48 and tangentially into the upper end of a cyclone 49.

As illustrated in FIGS. 7 and 8, the plates 41 may extend between a pair of inclined bars 51, at each side of the plates and inclined at a suitable angle, to accommodate the overlap of the plates. Bars 51 may be mounted on or form a part of side walls 52 of housing 35, while a pivot rod 53 may be attached to the underside of each plate to extend laterally, as in FIG. 8, through bars 51. Each outer end of each bar may be threaded, as shown, to receive a nut 54 adapted to be tightened against a washer, as shown, to retain each individual plate 41 in an adjusted position, such as between 10° and 25° to the horizontal. Material which does not fall through screen 36 will move over an inclined feed plate 55 onto the uppermost plate 41, to slide off this plate past the aperture between the plates through which air from blower 42 is passing. Such air removes a portion of the lighter flakes, as of cellulosic material, and the remainder of the material drops onto the next plate below, from which the separation step is repeated. Although the angularity of the plates 41 could be simultaneously adjusted, as through an appropriate lever and link system, the individual adjustment, as shown, may be found to be preferable, since the best results may be obtained with different plates at different angles. For instance, as flakes are removed by being blown away, the amount of material moving from plate to plate should decrease in a downward direction, so that a lesser inclination of the lower plates may be found to be desirable. Other factors, such as variation in air volume from top to bottom and the removal properties of the flakes as more and more are removed, may affect the setting. Also, variations in the average angle of the plates may be used to accommodate variations in the proportion of flakes in the feed.

The screen 36 cooperates with the air separating device, including plates 41, through its tendency to produce an essentially uniform thickness of carpet of material flowing onto the air separator. While the hammermill H of FIG. 2 tends to equalize output, the screen is more effective in producing uniformity of feed to the air separator, particularly in smoothing out variations in light material, acting as a vibrating chute. This action should overcome any tendency for the air separator to blow away more than it should, if the feed becomes materially less, or to blow away less than desired, if the feed becomes materially greater.

In the upper portion of cyclone 49 of FIG. 3, the stream of air and light flakes moves tangentially for reduction of air velocity and downward settling of the fibers through a cone 56, accompanied by discharge of the separated air through an outlet 57. The separated fibers fall downwardly from the cyclone into the upper rear end of a second disintegrator, such as a hammermill H' having rotor shafts 26' and 27' and constructed in essentially the same manner as the hammermill described previously, but narrower and with a greater number but thinner hammers, since the feed material is considerably smaller than that handled by hammermill H. Thus, the hammermill of FIG. 3 may be provided with a panel 29' pivoted on a shaft 30' for movement forwardly and downwardly from a housing 28', for inspection and maintenance purposes, while the hammermill may be mounted on a foundation 32' having an outlet 31' for finely shredded fibers of cellulosic material, discharged through the screen at the bottom of the lower rotor on the shaft 27' of the hammermill.

A tank 58 contains a fireproofing solution, which may be an aqueous solution of approximately 30–45% solids, the latter consisting of one half $MgCl_2$ and one half $Na_2CO_3$. The treatment of cellulose flakes with such a solution, to form an insulating material, is the joint invention of Michael Grabowski and the present applicant. The mixture of magnesium chloride and soda ash prevents the liquid from bleeding off the shredded paper at temperatures up to 120° C. and humidity up to 100%. Also, as the solution soaks into the paper and is then dried, the presence of magnesium chloride and other chemicals in the fibers essentially precludes the insulation thus produced from burning. The fireproofing solution may be fed through a pipe 59 controlled by a valve 60 into a manifold 61, extending longitudinally of and above the rotor mounted on upper shaft 26' and provided with a series of nozzles 62, round or having laterally diverging or wide apertures for spraying the fireproofing solution onto the cellulose flakes as they fall downwardly into the hammermill, in which the solution is mixed with the flakes as the flakes are ground finer by the hammermill. Thus, the hammermill H' not only provides the function of further cutting, grinding and reducing the flakes in size, but also that of mixing the fireproofing solution intimately with the flakes. The hammermill H' of the preferred type has the further advantage of being able to shred and grind cellulosic material, such as paper, when wet, so that the fireproofing solution may be aqueous and sprayed onto the paper, rather than being in powder form. The powder is very difficult to apply to or mix with paper shreds, but is required for prior known hammermills.

The hammermill foundation 32' is conveniently provided with a passage 64 extending beneath outlet 31' and in the entrance of which a burner 65 is installed, for producing heated air to heat the discharged, now finely shredded paper flakes, and move the same to an inlet of a blower housing 45' in which a blower impeller 46' is installed, mounted on a shaft, as shown, in turn mounted on support 47' and driven in a conventional manner, as by a belt and drive motor (not shown). Impeller 46' blows the hot air and the cellulosic flakes with it, upwardly in a pipe 66 which ascends to a position below the top wall 67 of a disinfecting and drying vessel V, then curves slightly upwardly and laterally as a section 68 which extends through the side wall 69 of vessel V, as in FIG. 4, for tangential discharge of the paper flakes just below top 67 to produce settling of the same in the interior of the vessel V. The heated air produced by the burner 65, as at 150° C. to 200° C., remains with the paper until it settles within the vessel V and heats or assists in heating the interior of the vessel to a desired temperature, such as 200° C. to 220° C. In the event that additional heat is required, steam or other heating fluid may be supplied to a heating coil 70 of FIG. 4, through an inlet 71 for circulation through the coil and exhaust from an outlet 72. Coil 70 may extend for one-third to one-half, as shown, of the upper portion of vessel V, and may be covered with insulation 73, which may also be placed around the lower half of vessel V, such as insulation 73' of FIGS. 3 and 9. The top 67 of vessel V, as well as passage 64 beyond foundation 32', blower housing 45', pipe 66 and pipe 68 may similarly be insulated. As the impregnated paper shreds settle downwardly in vessel V, they are initially heated to a sufficient temperature and for a sufficient period of time, as for four hours at 200° C., to tend to disinfect the shreds and render them bacteriologically sterile. In addition, the shredded paper is heated, not only to drive off moisture previously contained therein but also the moisture added by spraying the solution from tank 58 onto them, to produce a moisture content of 5% to 10%. In the event that sterilization is not completed by heat alone, at the lower pressure present in vessel V, further treatment by a liquid or gaseous disinfectant may be utilized, as described below.

The water vapor produced by heating of the paper shreds in vessel V, as well as air introduced with the shreds through pipe section 68, is removed from the vessel through a series of pipes 74 having perforations or holes 75, as in FIG. 10, from their lower ends up to a point corresponding to on the order of two-thirds to three-quarters of the height of vessel V. The perforations 75 are exaggerated in size and spacing in FIG. 10 for clarity of illustration, since they should occupy only a fraction of the surface area of the pipes and particularly should be relatively small, as on the order of 2–5 mm. in diameter, or width of slit, to prevent paper shreds, particularly when dry, from being drawn through the holes and into the pipes. Although a single central pipe might, under some circumstances, be found suitable, it will normally be preferable to utilize a series of pipes spaced equidistantly around the center of the vessel at positions greater than one-half the radius, so as to equalize the area inwardly and outwardly from each pipe from which the respective pipe draws moisture vapors and air. The holes 75 are not present in the upper one-third to one-quarter of vessel V, thereby permitting the heated air carrying the shreds to be pulled downwardly through the layers of shreds in this upper portion and drive off as much moisture as possible. However, moisture driven off in such upper portion will be drawn downwardly with the heated air for evacuation through the pipes. Each pipe 74 may extend upwardly through top 67 of the vessel to a blower housing 45" containing an impeller 46" mounted on a shaft, in turn mounted above vessel V on a support 47" and driven in a conventional manner, as before. The air and vapor withdrawn from vessel V by impeller 46" is discharged through an outlet 77, as indicated by the arrow. An alternative vapor and air withdrawal pipe arrangement is illustrated in FIG. 11, in which a pipe 74 is constructed similarly to FIG. 10, but an imperforate inner tube 78 is normally located in the imperforate upper portion of pipe 74. Tube 78 may be lowered in a suitable manner, as to the dotted position shown, to cover a portion of the holes 75 and thus regulate the area from which pipes 74 withdraw vapor and air, so as to increase the depth to which heated air from pipe section 68 travels before being withdrawn. In the event that suction through holes 75 is unduly reduced by the open lower end of pipe 74, as in FIG. 10, the lower end of pipe 74 may be closed, as by a plug 79 of FIG. 11, which is removable for access to cleaning out any particles which may accumulate in the lower end of the pipe.

Vessel V may be supported by a frame 80, at the center of which may be mounted an integral motor and reduction gearing drive 81, which extends upwardly through bottom 82 of the vessel to a drive ring 83 having a conical tip, as shown. A pair of flexible blades 84 are attached to ring 83 for relatively slow rotation around the bottom of the vessel. As the mass of drying or dried and disinfected paper shreds moves downwardly toward the bottom 82, it will be engaged by the blades 84 which, because of their flexibility, will tend to assume a spiral shape on the order of that shown in FIG. 9. Thus, each blade 84 is preferably longer than a radius, so as to extend spirally to the wall of the vessel and move material into a screw conveyor 85, for discharge from the vessel, or a screw conveyor 86, for recirculation to impeller 46' and reintroduction into the vessel through pipe section 68. Screw conveyors 85 and 86 may be driven in a conventional manner (not shown) while the former may move completed insulation material to a rotating feeder 87 for discharge onto a screw conveyor 88 which may deliver the insulation to trucks or vans, if shipped in bulk, or to conventional packaging equipment. For recirculation, conveyor 86 moves the paper shreds to a rotary feeder 87' for delivery to passage 64 and blower housing 45'. Conveyors 85 and 86 may be operated alternately, or at times concurrently, depending upon conditions. Thus, if the paper reaching the bottom of the vessel has not been sufficiently treated, conveyor 86 only may be operated for recirculation purposes. Also, if all of the paper reaching the bottom of the vessel has been sufficiently treated, conveyor 85 may be operated alone, although there could be times during which the treatment process of incoming feed could be expedited by recirculating a portion of the fully treated paper, in which event both conveyors would be operated.

In the event that the pressure in vessel V, for instance, is insufficient to produce the desired sterilization at the temperature used, additional treatment may be utilized, as by a gas or liquid. Liquid treatment, particularly with a non-toxic liquid such as a 0.5% to 1.0% solution of propionic acid, e.g. $CH_3 \cdot CH_2 \cdot CO_2H$, or a somewhat toxic solution of calcium hypochlorite. Such a solution may be sprayed onto the material moved upwardly by conveyor 88 through a series of nozzle equipped pipes 89. When the additional disinfection agent is gaseous, such as $Cl_2$ or $SO_2$, material may be delivered from conveyor 88 to a vessel in which the material is exposed to the disinfecting gas with appropriate safeguards because of toxicity of the gas.

Rather than making insulation, the shredded paper, dried and disinfected in vessel V and optionally sprayed with a suitable treating agent, may be delivered, as from conveyor 88, to equipment for making paper board, cardboard, or other compressed paper products. For the above purpose, it may not be necessary to add the fireproofing solution from tank 58, or when the shredded paper is supplied as a fuel, as for the boilers of a power plant, for instance. For the latter purpose, the dried cellulose shreds may be baled for transportation, with a bale breaker used at the power plant. In cases where fuel is conveniently used in the form of lumps, the shreds may be briquetted, as under high pressure, particularly for long distance shipping, automated bulk handling or pulp recycling. In any event, the vessel V has a capacity to act as a storage bin and hold many tons of material for an appropriate period of treatment time and absorb the most voluminous part of the refuse from a city, for instance, in an odor and dust free manner until the material can be used, or bagged, as in dust free plastic bags for total enclosure. In lieu of blower impeller 46', a high pressure, rotor type compressor may be used, such as acting through an eductor nozzle, to pick up the flakes and carry them into the vessel. Such an arrangement may be utilized to produce a higher air pressure in the vessel and a "pressure cooker" effect, to reduce the time or temperature required, or both, to accomplish disinfection.

It may also be desirable to discharge from conveyor 88 into a screening plant to remove dirt and dust, which may initially cling to the moist paper, cardboard and the like, but which separates during the drying process and also through friction while loading, recirculating or discharging from vessel V. Such elimination or reduction of dirt, dust and the like may be particularly advantageous when the paper is to be used for recycling, where a lower dirt content has a substantial value.

Figures 5, 6:
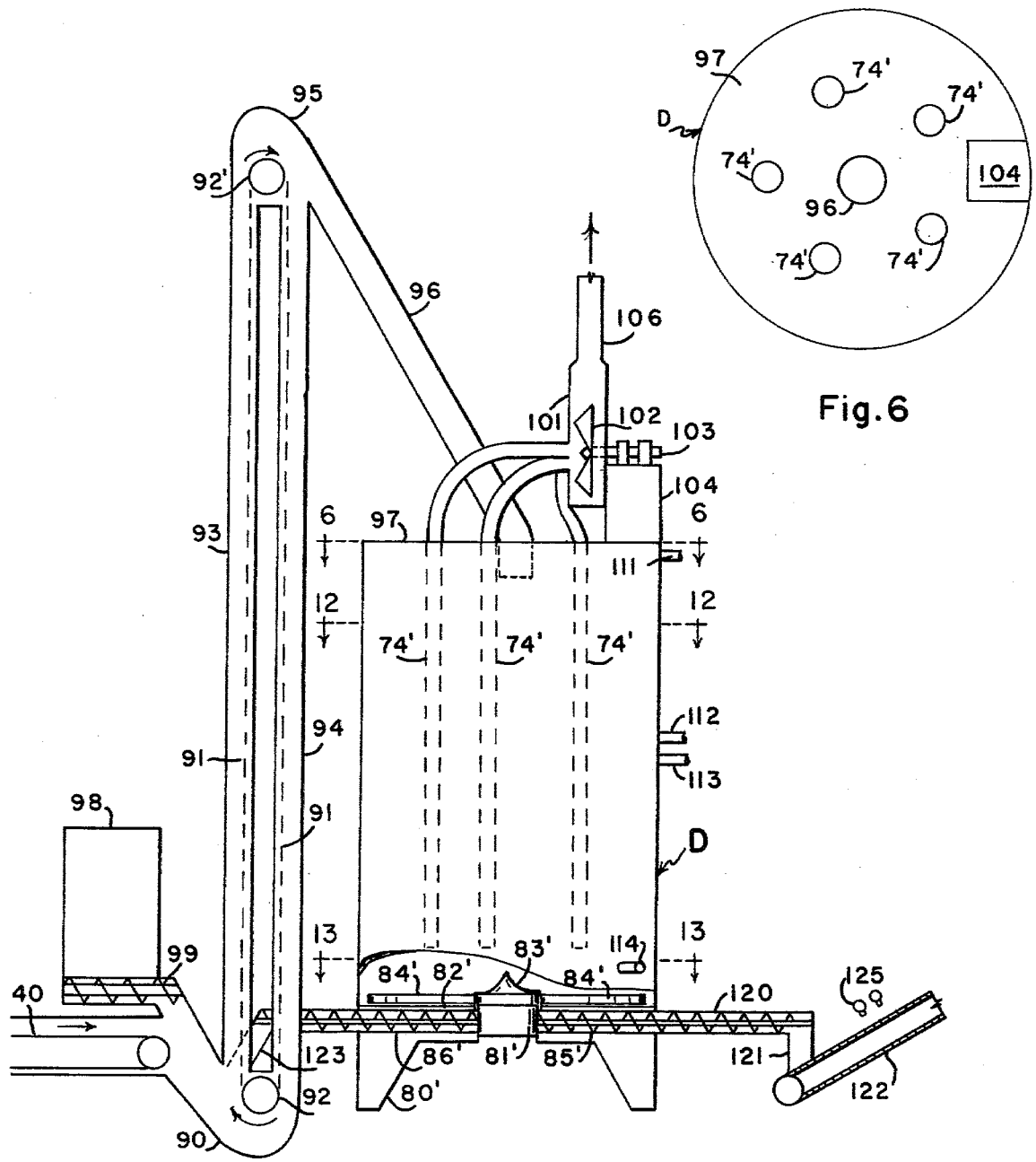
FIG. 5 is a diagrammatic side elevation of a compost digester section, including a novel compost digester.
FIG. 6 is a diagrammatic cross section on an enlarged scale, taken along line 6—6 of FIG. 5.

The fine but relatively heavy fraction passing through the screen 36 of the separator S of FIG. 3, which normally includes organic waste, including food and lawn waste material, as well as relatively hard material, such as glass, ceramic, brick, stone and the like which has been shattered into tiny particles, is transported by conveyor 40 of FIG. 3 to a position, as in FIG. 5, for discharge into an intake 90 of a housing for a bucket conveyor. The conventional buckets of the conveyor are mounted on a belt 91 which moves around a lower pulley 92, in order to scoop up the material in the intake and move upwardly through an upward leg 93 of the housing and around an upper pulley 92', for discharge of the material, then return downwardly through a downward leg 94, as indicated by the arrows at the pulleys. The legs 93 and 94 are closed at the upper end by a housing top 95, while the material is discharged from the conveyor buckets into a pipe 96 which is inclined sharply downwardly to extend through a top wall 97 of a digester D. Sewage sludge or other suitable product, such as manure, is stored in a tank 98, for addition to the fine but relatively heavy fraction, through a conveyor 99 which discharges into conveyor intake 90. The material from the two sources is thus carried upwardly by the bucket conveyor for discharge into the digester D at the top and is heated there for a suitable retention time, such as one to four days. Thus, the digester D should have a sufficient size to receive on the order of four days production of the fine but heavy waste material and the sewage sludge added thereto. Bacterial action in the material forms a compost under the action of heat, and perhaps some pressure, which will provide a highly suitable material for use as a fertilizer or as a compost for use in nurseries and greenhouses. The finely shattered, hard material, including glass, ceramic and the like, adds considerably to the effectiveness of the compost, since sand grains with sharp corners, as well as similar granules, as of glass or ceramic, have a highly beneficial effect in stimulating the spreading and splitting of young roots. Comparative tests with compost containing sand with rounded corners have indicated a considerably less root development than with compost containing sand with sharp corners. In addition, the fine particles of glass or the like, due to the excellent results of shattering provided by the preferred hammermill, are sufficiently fine that objections to compost containing glass slivers, as produced by prior hammermills, are overcome.

As the material passes downwardly within the digester D, gaseous products of the reaction are withdrawn through a series of pipes 74', similar to the pipes 74 of FIGS. 3 and 10 in having multitudinous small holes therein, as in FIG. 10, but comprising about 3% to 10% of the surface area of the pipes. As before, these holes may be limited to the lower two-thirds of the pipes, although in the present instance, it may be desired to extend the area of the holes to a position near the top of the digester, since the gaseous products of formation of the compost are being withdrawn at those upper positions as well, while air or the like is not being introduced with the material fed into the digester. With proper control of the bacterial action, all or a large proportion of the gases produced may be methane, which is particularly useful for supplying heat, as through the burner 65 of FIG. 3, for heating the shreds of paper or cellulosic material for drying or disinfecting or assistance in disinfection. The byproduct methane gas produced in digester D thus cooperates materially with the operation of the disinfecting and drying vessel V of FIG. 3. The gaseous products removed through pipes 74' are led to the inlet of a blower housing 101 in which is installed an impeller 102 mounted on a shaft 103, in turn mounted on a support 104 and driven in a conventional manner, as before. The support 104 should have sufficient height, similar to support 47" of FIG. 3, to provide a sufficient elevation of the blower inlet for readier connection of the pipes 74' thereto. The gases so withdrawn from the digester D are moved by impeller 102 through an outlet 106, as indicated by the arrow, which is connected to storage facilities and/or to pumps for supplying the methane, if of sufficient concentration, to the burner 65 of FIG. 3.

Figure 12:
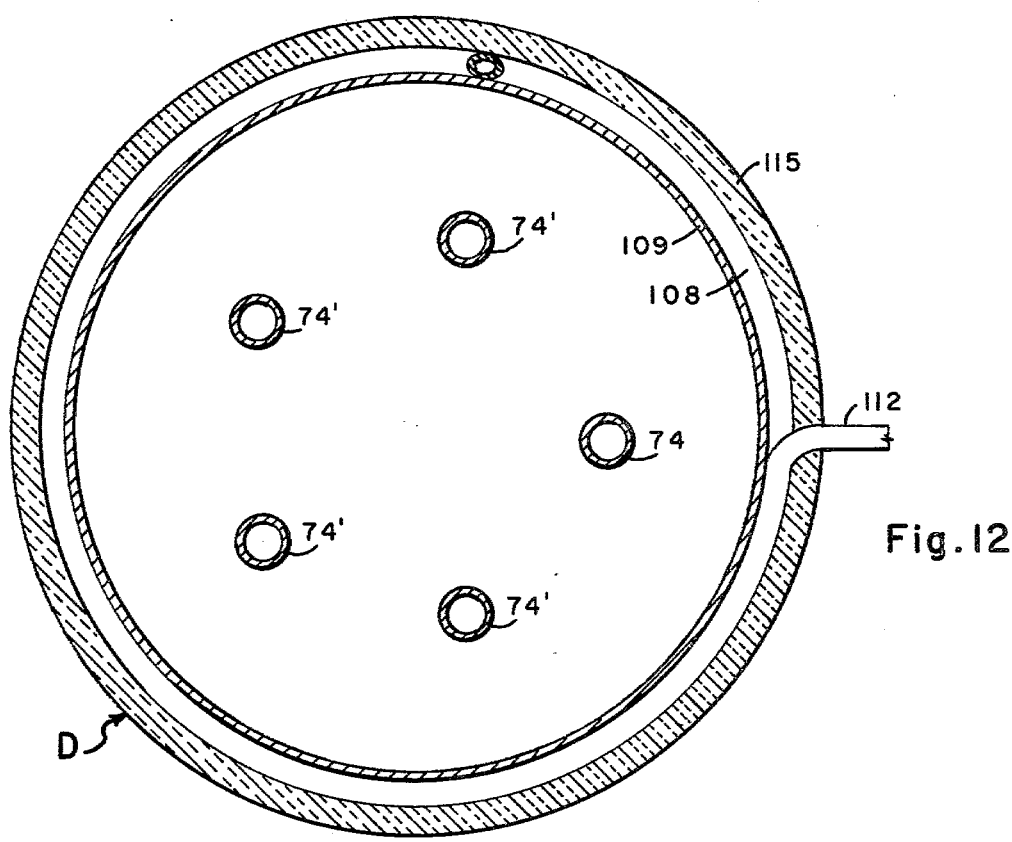
FIG. 12 is a horizontal section taken along line 12—12 of FIG. 5, on an enlarged scale and adjacent the upper end of the compost digester.
Figure 13:
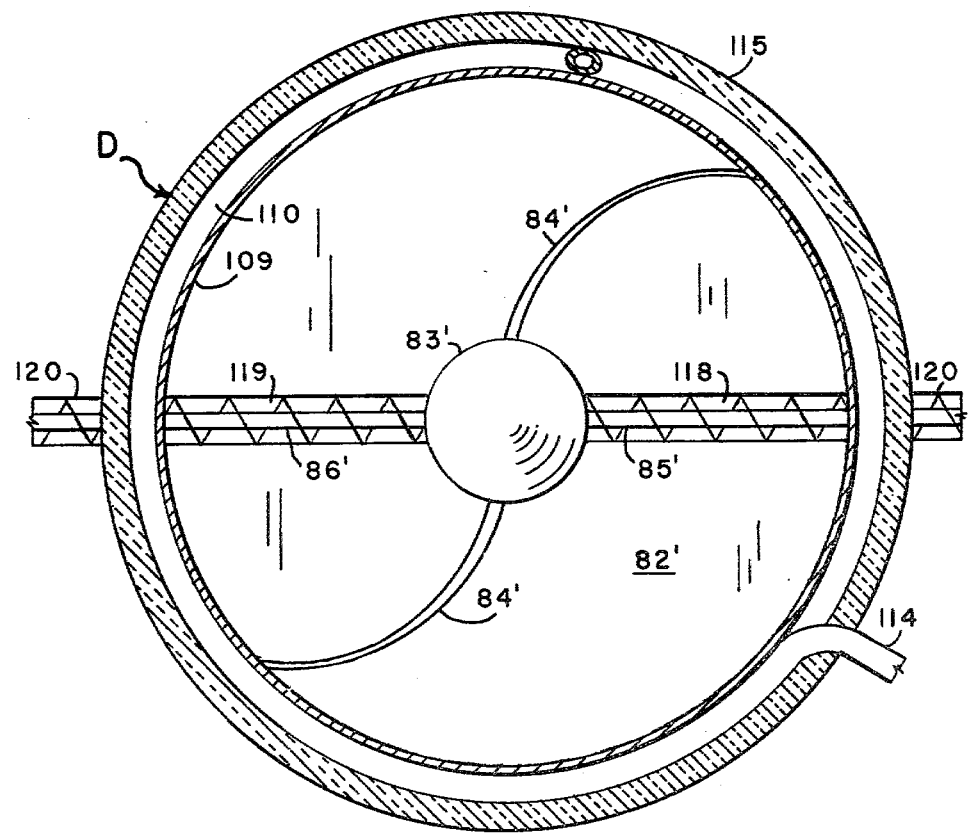
FIG. 13 is a partly diagrammatic horizontal section, taken along line 13—13 of FIG. 5, on an enlarged scale and near the bottom of the compost digester.

During treatment in the digester D, if heat in addition to that generated by the bacterial action is necessary, it may be supplied through an upper coil 108, which surrounds the side wall 109 of the digester, as in FIG. 12, and a similar lower coil 110, as in FIG. 13, which surrounds the side wall at the lower portion of the digester. A suitable heating fluid, such as steam, may be supplied through an inlet 111 and discharged through an outlet 112 of the upper coil, as in FIG. 5, while a heating fluid similarly may be circulated through the lower heating coil 110, from an inlet 113 to an outlet 114. When steam is used as the heating medium, the inlet of each coil is at the upper end and the outlet at the lower end, described above, to permit any condensate formed to drain from the outlet. However, if a different heating fluid is circulated through either or both coils, the entrance and exit points of the heating fluid may be reversed. The two heating coils permit the temperature in the upper and lower portions of the digester to be controlled, so as to add sufficient heat to provide adequate formation of compost as the material moves downwardly in the digester. However, if more heat than is necessary for treatment of the material is being produced, the circulation of the heat exchange liquid, if water, may be reversed so that heated water, or steam if produced, may be led from the former inlets 111 or 113 to the heating coil 70 of the vessel V of FIG. 3. Thus, the digester D may cooperate with the disinfection and drying vessel V in this additional manner.

The digester D may be supported by a frame 80' which also supports a central, integral motor and gear drive 81' which extends through a bottom 82' of the digester. A ring 83' having a cone tip, as shown, is mounted atop the drive 81' for rotation at a relatively slow rate to rotate a pair of flexible blades 84' to move material around the bottom of the digester. As before, the flexible blades are preferably longer than a radius of the digester and will tend to assume a spiral shape as in FIG. 13, in order to move compost along the bottom from the area extending out to the cylindrical wall 109. The compost moved by the blades 84' is moved into a trough 118 of a conveyor 85', as in FIG. 13, which is actuated when discharge of completed compost is desired, and also into a trough 119 of a conveyor 86' which recirculates, at desired times, compost to the incoming feed. On the outside of the digester, the conveyors 85' and 86' each operate within a tube 120. The discharge conveyor 85, as in FIG. 5, moves the completed compost to an outlet 121 for discharge onto a conveyor belt 122, from which the compost may be moved to railway cars, trucks or the like for transportation in large quantity, or to a packaging plant in which it may be packaged in suitable bags, as of plastic. Packaging is particularly desirable for compost which is to be utilized as potting soil for greenhouses and the like. As indicated previously, due to the presence of the shattered particles of glass or the like, a potting soil of this invention is particularly suitable for use in growing young plants. For the latter purpose, special soil nutrients may be sprayed onto the compost moved along belt 122, through nozzle equipped pipes 125, or any other appropriate solution for other purposes. For recirculation, conveyor 86' may discharge into a recirculation pipe 123, which, in turn discharges into intake 90 of the conveyor housing. The proportion of compost discharged by conveyor 85', as compared with the amount of compost recirculated by conveyor 86', will depend primarily upon the condition of the material as it is moving downwardly in the digester. Thus, when an increase in bacterial action of incoming materials is desired, a greater amount of compost may be recirculated from the bottom of the digester. Also, when the material is not completely digested, recirculation of material is very desirable. However, when a considerable amount of material, such as in the lower half of the digester, has been treated to completion of the digesting operation, a greater amount of material may be discharged by the conveyor 85'.

Although a plurality of process and apparatus embodiments of this invention have been illustrated and described and various changes therein have been indicated, it will be understood that other embodiments may exist and that other changes may be made, without departing from the spirit and scope of this invention.

What is claimed is:

1. A process for treating waste material which may include magnetic and non-magnetic metal material and which includes cellulosic fiber materials, relatively hard materials having a hardness on the order of glass, ceramic, and stone, relatively soft material, on the order of food waste or lawn waste and intermediate material, which comprises:
    (a) separating removable magnetic metal material present;
    (b) comminuting the remaining material, including impacting the hard material, to produce sufficiently small sizes for separation;
    (c) separating finely divided material including relatively hard and relatively soft material simultaneously by passing through apertures;
    (d) separating and removing lighter cellulosic fiber material;
    (e) separating and removing intermediate material;
    (f) introducing increments of separated, relatively hard and relatively soft, finely divided material into the upper portion of a compost producing treatment space;
    (g) recirculating portions of said material from the lower portion of said treatment space into the upper portion of said treatment space; and (h) discharging portions of treated material from the lower portion of said treatment space.

2. A process as set forth in claim 1, including:
providing a supply of a waste product having plant nutrient values; and
transferring said waste product in increments to said treatment space with said finely divided material.

3. A process as set forth in claim 1, which includes:
removing gases from the interior of said treatment space.

4. A process as set forth in claim 3, wherein:
said gas removal is via a plurality of upright pipes within said treatment space and spaced about the interior thereof.

5. Apparatus for treating waste material which may include magnetic and non-magnetic metal material and which includes cellulosic fiber materials, relatively hard materials having a hardness on the order of glass, ceramic, and stone, relatively soft material, on the order of food waste or lawn waste, and intermediate material, which comprises:
   (a) means for separating and removing removable magnetic metal material present;
   (b) means for comminuting the remaining material, including impacting the hard material, to produce sufficiently small sizes for separation;
   (c) means having apertures for separating finely divided material including relatively hard and relatively soft material simultaneously;
   (d) means for separating and removing lighter cellulosic fiber material;
   (e) means for separating and removing intermediate material;
   (f) means for introducing increments of said separated, relatively hard and relatively soft, finely divided material into the upper portion of a compost producing treatment space;
   (g) means for recirculating portions of said material from the lower portion of said treatment space into the upper portion of said treatment space; and
   (h) means for discharging portions of treated material from the lower portion of said treatment space.

6. Apparatus as set forth in claim 5, including:
an upright, cylindrical vessel in which said finely divided material is introduced at the top and moves downwardly therein for production of a compost;
means for heating said material in said vessel;
means for removing gaseous products of compost production;
means for recirculating a portion of said material from adjacent the bottom to the top of said vessel; and
means for discharging completed compost from adjacent the bottom of said vessel.

7. Apparatus as set forth in claim 6, including:
a series of upright pipes extending downwardly into said vessel and provided over a substantial portion of the length thereof, from the lower end upwardly, with apertures for removing gaseous products of compost production; and
suction means connected to the upper ends of said pipes for removing said gaseous products.

8. Apparatus as set forth in claim 7, including:
an essentially circumferentially imperforate, hollow tube within at least a portion of said upright pipes and adjustable upwardly and downwardly to close a predetermined number of said apertures.

9. Apparatus as set forth in claim 6, including:
first conveyor means extending outwardly at the bottom of said vessel for moving said material from the bottom of said vessel to means for recirculating said material to the upper portion of said vessel; and
second conveyor means extending outwardly at the bottom of said vessel for moving said material for discharge of the same.

10. Apparatus as set forth in claim 6, including:
a generally upright conveyor having an inlet at a lower position and an outlet at a position above said vessel, with a feed pipe leading from said outlet to the interior of said vessel adjacent the top therefor;
means for feeding said finely divided material to the inlet of said conveyor;
a tank containing material having plant nutrient values;
means for feeding said material from said tank to the inlet of said conveyor; and
means for transferring a portion of the material from adjacent the bottom of said vessel to said conveyor inlet for recirculation.

11. Apparatus for producing a compost of finely divided, relatively soft material derived from food waste and lawn waste and finely divided, relatively hard material having a hardness on the order of glass, ceramic, and stone, comprising:
an upright, cylindrical vessel in which said finely divided material is introduced at the top and moves downwardly therein for production of compost;
means for heating said material in said vessel;
means for removing gaseous products of compost production, including a series of upright pipes extending downwardly into said vessel and provided with apertures over a substantial portion of the length thereof, from the lower end upwardly, and suction means connected to the upper ends of said pipes;
means for recirculating a portion of said material from adjacent the bottom to the top of said vessel;
first conveyor means extending outwardly at the bottom of said vessel for removing said material from the bottom of said vessel to said means for recirculating said material to the upper portion of said vessel;
second conveyor means extending outwardly at the bottom of said vessel for moving said material for discharge of the same;
at least one flexible sweep movable around the bottom of said vessel for moving material to said conveyors; and
means for rotating said sweep.

12. Apparatus as set forth in claim 11, including:
a generally upright conveyor having an inlet at a lower position and an outlet at a position above said vessel, with a feed pipe leading from said outlet to the interior of said vessel adjacent the top thereof;
means for feeding said finely divided material to the inlet of said conveyor;
a tank containing material having plant nutrient values;
means for feeding said material from said tank to the inlet of said conveyor; and
said recirculation means transferring material from adjacent the bottom of said vessel to said conveyor inlet.

13. Apparatus as set forth in claim 11, including:
an essentially circumferentially imperforate, hollow tube within at least a portion of said upright pipes and adjustable upwardly and downwardly to close a predetermined number of said apertures.

* * * * *